US005883888A

United States Patent [19]

St-Pierre

[11] Patent Number: 5,883,888

[45] Date of Patent: Mar. 16, 1999

[54] SEAMLESS SOFT HANDOFF IN A CDMA CELLULAR COMMUNICATIONS SYSTEM

[75] Inventor: Sylvain St-Pierre, St. Lazare, Canada

[73] Assignee: Telefonaktiebolaget LM Ericsson, Stockholm, Sweden

[21] Appl. No.: 759,970

[22] Filed: Dec. 3, 1996

[51] Int. Cl.[6] .................... H04J 13/00

[52] U.S. Cl. .................... 370/331; 370/335; 370/350

[58] Field of Search .................... 370/328, 329, 370/331, 332, 333, 334, 335, 342, 350, 503, 506, 509, 512, 516, 518, 522; 455/436, 437, 442, 443, 502, 503

[56] References Cited

U.S. PATENT DOCUMENTS

| | | | |
|---|---|---|---|
| 4,901,307 | 2/1990 | Gilhousen et al. | 370/230 |
| 5,056,109 | 10/1991 | Gilhousen et al. | 370/342 |
| 5,101,501 | 3/1992 | Gilhousen et al. | 455/442 |
| 5,103,459 | 4/1992 | Gilhousen et al. | 370/209 |
| 5,179,571 | 1/1993 | Schilling | 370/331 |
| 5,195,090 | 3/1993 | Bolliger et al. | 370/314 |
| 5,257,404 | 10/1993 | Goreham et al. | 455/503 |
| 5,267,261 | 11/1993 | Blakeney, II et al. | 370/332 |
| 5,305,308 | 4/1994 | English et al. | 370/335 |
| 5,325,419 | 6/1994 | Connolly et al. | 455/435 |
| 5,404,575 | 4/1995 | Lehto | 455/502 |
| 5,432,842 | 7/1995 | Kinoshita | 455/440 |
| 5,673,260 | 9/1997 | Umeda et al. | 370/342 |
| 5,677,908 | 10/1997 | Oura | 370/331 |
| 5,697,055 | 12/1997 | Gihousen et al. | 455/436 |
| 5,722,074 | 2/1998 | Muszynski | 455/442 |
| 5,740,166 | 4/1998 | Ekemark et al. | 370/331 |
| 5,828,659 | 10/1998 | Teder et al. | 370/328 |

FOREIGN PATENT DOCUMENTS

| | | |
|---|---|---|
| 0 444 485 | 2/1991 | European Pat. Off. . |
| 0 568 212 | 4/1993 | European Pat. Off. . |
| 0 676 908 | 4/1995 | European Pat. Off. . |
| WO 93/06663 | 4/1993 | WIPO . |
| WO 94/30024 | 12/1994 | WIPO . |
| WO 95/08899 | 3/1995 | WIPO . |
| WO9512297 | 4/1995 | WIPO . |
| WO 95/20865 | 8/1995 | WIPO . |

OTHER PUBLICATIONS

PCT Search Report, Nov. 21, 1997, PCT/SE 97/01965.

*Primary Examiner*—Chi H. Pham
*Assistant Examiner*—Kwang B. Yao
*Attorney, Agent, or Firm*—Jenkens & Gilchrist

[57] ABSTRACT

During a "make before you break" handoff performed within a CDMA communications system, duplicate downlink communications are generated and routed through different base stations for delivery to the mobile station. At the mobile station, the duplicate signals are received and the frame sequence numbers of the substantially simultaneously received frames therein are compared. If the sequence numbers do not match, the duplicate signals are identified as not being synchronously received by the mobile station. In response thereto, the mobile station signals the communications network on the uplink with a timing adjustment message, and appropriate timing modifications are made with respect to the transmission of the duplicate signals in order to provide for substantially synchronous reception. Diversity combination and decoding are then performed on the received signals. Alternatively, the mobile station buffers the earlier arriving signal and waits for the later arrival of the sequence number matching frame of the duplicate signal before engaging in diversity combining and decoding of the received signals.

25 Claims, 4 Drawing Sheets

CALL THROUGH 1ST BASE STATION 42
DETECT NEED FOR HANDOFF 44
INFORM NETWORK 46
INSTRUCT 2ND BASE STATION TO COMMUNICATE 48
SIMULTANEOUS CALL THROUGH 1ST AND 2ND BASE STATIONS 50
50'
RECEIVE FRAMES 58
COMPARE SEQUENCE NUMBERS 60
MATCH ? 62
Y
N
INFORM NETWORK 64
DIVERSITY COMBINE 68
INSTRUCT TIMING ADJUSTMENT 66
72
REPEAT AS NEEDED

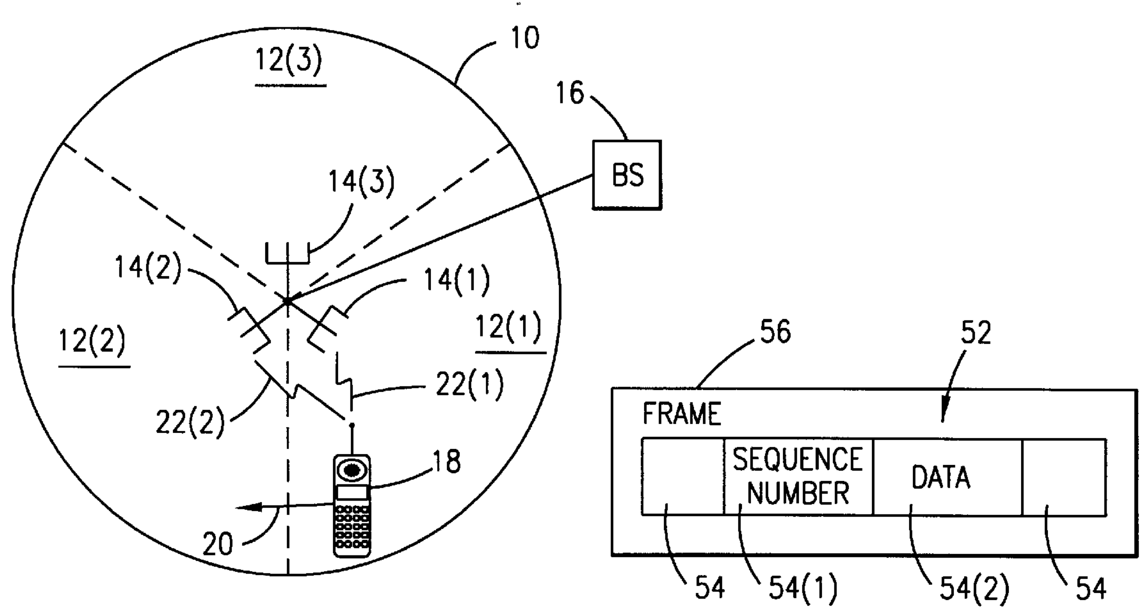
FIG. 1A
FIG. 3
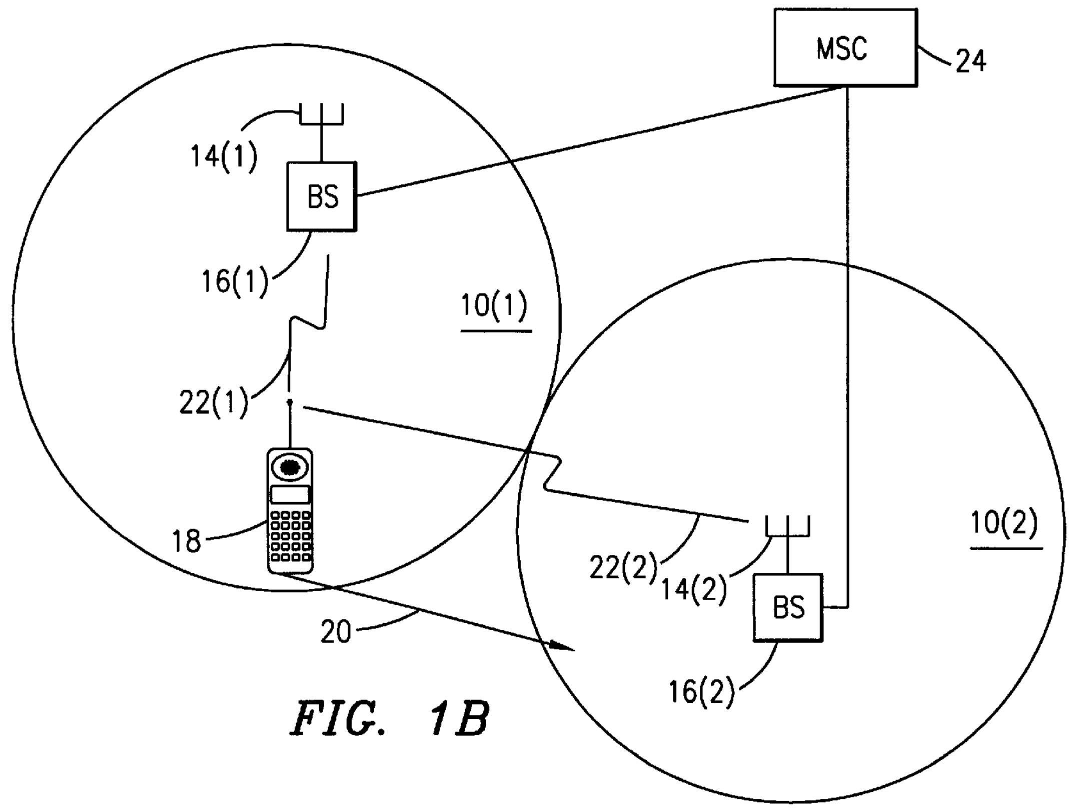
FIG. 1B

SEAMLESS SOFT HANDOFF IN A CDMA CELLULAR COMMUNICATIONS SYSTEM

BACKGROUND OF THE INVENTION

1. Technical Field of the Invention

The present invention relates to the transmission of duplicate communications and, in particular, to the synchronous reception of the duplicate communications. The present invention more specifically relates to handoff within a cellular telephone system and, in particular, to a method and apparatus for effectuating a seamless soft handoff within a code division multiple access (CDMA) cellular communications system wherein the call subject to handoff utilizes duplicate downlink communication transmissions.

2. Description of Related Art

System configuration and operation of a code division multiple access (CDMA) cellular communications system is well known to those skilled in the art. Accordingly, detailed information concerning CDMA system configuration and operation is not provided. However, technical information concerning this topic may be obtained by referring to a number of available documents. For example, for a description of the use of CDMA techniques in a multiple access communications system, reference is made to U.S. Pat. No. 4,901,307, entitled "Spread Spectrum Multiple Access Communication System Using Satellite or Terrestrial Repeaters". Furthermore, for a description of the generation of signal waveforms for use in a CDMA communications system, reference is made to U.S. Pat. No. 5,103,459, entitled "System and Method for Generating Signal Waveforms in a CDMA Cellular Telephone System". Finally, for an identification of industry standards relating to CDMA cellular communications systems, reference is made to TIA/EIA Interim Standard IS-95-A dated May, 1995. The disclosures of the foregoing references are expressly incorporated by reference herein.

In cellular communications systems of many types (for example, frequency division multiple access (FDMA) systems such as the Advanced Mobile Phone System (AMPS), or combined FDMA and time division multiple access (TDMA) systems such as the Global System for Mobile (GSM) communications, or code division multiple access (CDMA) systems such as that specified by IS-95-A), a handoff scheme of some sort is implemented to allow a cellular call to continue in instances when a mobile station crosses the boundary between two cells. In one commonly used handoff scheme, handoff is initiated when received signal strength in a given cell (or sectors if cell is split, with each sector considered orthogonal) for mobile station communication falls below a given threshold. The system then determines whether a neighboring cell can receive mobile station communications with a greater signal strength. If such a cell is identified, that cell is selected for the handoff. In another commonly used handoff scheme, the mobile station additionally or alternatively makes downlink signal strength measurements with respect to the given cell and its neighboring cells. These measurements are reported to the system for use in making the handoff determination and selecting the cell to which handoff occurs. In either of these schemes, the system informs the mobile station as to which cell is to be used in the future for continuing the call, and a corresponding re-routing of the call to that cell is made.

In conventional FDMA or FDMA/TDMA type cellular communications systems, each (adjacent) cell operates with a different set of radio frequencies. Accordingly, for each of the foregoing handoff schemes, the handoff must comprise a "hard" handoff. By this it is meant that the mobile station must change transceiver operation from a radio frequency used in and assigned to the current cell to a radio frequency used in and assigned to the new cell. Due to the limited functionalities of the transceiver for the mobile station, the mobile station must break its communication link with the currently serving cell before making the communication link with the newly serving cell. This "break before you make" hard handoff operation presents some serious operational concerns because it is especially susceptible to loss of information during the time elapsed between the "break" of the old link and the "make" of the new link.

In CDMA communications systems, however, the same frequency band can be used for all cells. Accordingly, for each of the foregoing handoff schemes, the handoff may comprise a "soft" handoff. By this it is meant that the mobile station needs not necessarily change frequencies when switching communications from the current cell to the new cell. Communication with the mobile station is often simultaneously effectuated by two or more cells using the same frequency band, with the call switched between the two or more cells as measured signal strength dictates. When the signal strength measurements confirm a complete mobile station transition into the newly serving cell, communications utilizing the prior cell are discontinued. This "make before you break" soft handoff operation is less susceptible to instances of loss of information because the mobile station is continuously in communication with at least one cell throughout the handoff process.

Operation of a code division multiple access cellular communications system to implement soft handoff operation is well known to those skilled in the art. Accordingly, detailed information concerning conventional CDMA soft handoff processes is not provided. However, technical information concerning this topic may be obtained by referring to a number of available documents. For example, for a description of a system for controlling soft handoff in a CDMA system, reference is made to U.S. Pat. No. 5,101,501, entitled "Method and System for Providing a Soft Handoff in Communications in a CDMA Cellular Telephone System". Furthermore, for a description of a system implementing mobile assisted soft handoff, reference is made to U.S. Pat. No. 5,267,261, entitled "Mobile Station Assisted Handoff in a CDMA Cellular Communications System". Still further, for a description of the use of a packet switching architecture to support, among other operations, a CDMA soft handoff, reference is made to U.S. Pat. No. 5,305,308, entitled "Wireless Access Telephone-To-Telephone Network Interface Architecture". The disclosures of the foregoing references are expressly incorporated by reference herein.

Handoff generally occurs with respect to one of two potential cell configurations. In a first configuration, see FIG. 1A, a cell 10 is divided into a plurality (typically three) sectors 12, each having a different associated antenna 14, but served by a single base station (BS) 16. As a mobile station 18 moves in the direction of arrow 20, it may pass from the radio coverage area of a first sector 12(1) of the cell 10 to the radio coverage area of a second sector 12(2) of the same cell. In such a case, and in accordance with the make before you break handoff process, the mobile station 18 simultaneously communicates with the base station 16 utilizing both a first antenna 14(1) and a second antenna 14(2), respectively. The duplicate frames of data simultaneously communicated between the mobile station 18 and base station 16 utilizing both antenna 14(1) or 14(2) and their associated communications paths 22(1) or 22(2) arrive at the intended destination substantially simultaneously (i.e., within microseconds of each other). This is important because synchronized processing of the duplicate transmitted frames is essential to proper soft handoff operation and continued processing of the call.

In a second configuration, see FIG. 1B, synchronization of frame processing becomes more problematic. Two cells 10 (possibly each including multiple sectors—not shown) are illustrated each served by a different base station 16 having an antenna 14. The base stations are connected to a mobile switching center (MSC) 24. As the mobile station 18 moves in the direction of arrow 20, it may pass from the radio coverage area of a first cell 10(1) to the radio coverage area of a second cell 10(2). In such a case, and in accordance with the make before you break handoff process, the mobile station 18 simultaneously communicates with the mobile switching center 24 utilizing both the first base station 16(1) and the second base station 16(2). The duplicate frames of data simultaneously communicated between the mobile station 18 and base station 16 utilizing either base station 16(1) or 16(2) and their associated communications paths 22(1) or 22(2) are assumed to arrive at the intended destination substantially simultaneously. However, due to differences in propagation times over the paths 22, as well as differences in transmission delay between the mobile switching center 24 and the base stations 16, the frames may not arrive substantially synchronously and in fact may be offset in time from each other by many milliseconds.

A CDMA frame may have a duration as short as 20 ms. If the encountered offset exceeds this frame duration, then the simultaneously transmitted duplicate frames may arrive at the destination a full frame or more apart from each other. Depending on the duration of this offset, synchronized processing of the duplicate transmitted frames may be difficult, if not impossible, and proper soft handoff operation impeded to a degree that potentially compromises call continuation.

Accordingly, the second configuration soft handoff of FIG. 1B requires the following: (1) routing of duplicate mobile station communications through different cells to a common call processing point (such as a mobile switching center); (2) simultaneous (i.e., synchronous) processing of the duplicate mobile station communications at the common call processing point; (3) routing of duplicate common call processing point communications through different cells to a mobile station; and (4) simultaneous (i.e., synchronous) processing of the duplicate common call processing point communications at the mobile station. First configuration soft handoff requires substantially the same operational characteristics except that the duplicate communications are instead routed through different antennas of the same cell (base station) rather than through different cells. Difficulties with synchronous processing are not, however, typically a concern because signal transmission times in FIG. 1A are nearly identical. Such is not the case, however, with FIG. 1B. There is a need then for a method and apparatus for facilitating synchronous processing of the duplicate communications in those instances where the signal transmission times of the duplicate communications are not substantially the same.

SUMMARY OF THE INVENTION

Duplicate communications are generated at an originating device and routed to a receiving device over different communications paths potentially having different transmission times. The duplicate communications each comprise a plurality of frames identified by frame sequence numbers. At the receiving device, substantially simultaneously received frames from the duplicate communications are processed to determine whether the frame sequence numbers associated with each received frame match. In one embodiment of the present invention, if the frame sequence numbers do not match, the receiving device generates and transmits a message indicative thereof for delivery to the originating device. Responsive thereto, the originating device adjusts the timing of the duplicate communication transmissions to provide for substantially synchronous reception at the receiving device of the matching frame sequence number identified frames therein. In another embodiment, the receiving device buffers the earlier arriving one of the duplicate communications until the matching frame sequence number identified frame of the other communication arrives.

In accordance with another aspect of the present invention, duplicate downlink communications are generated and routed through different base stations for delivery to the mobile station during a "make before you break" handoff process. At the mobile station, the duplicate signals are received and the sequence numbers of the substantially simultaneously received frames therein are compared. If the sequence numbers do not match, the mobile station signals the communications network on the uplink and appropriate timing modifications are made with respect to the transmission of the duplicate signals in order to provide for synchronous frame reception. Alternatively, the mobile station buffers the earlier arriving signal and waits for the later arrival of the sequence number matching frame of the duplicate signal.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1A (previously described) is a schematic diagram illustrating sectorization of a cell and an instance of soft handoff there between;

FIG. 1B (previously described) is a schematic diagram illustrating plural cells and an instance of soft handoff there between;

FIG. 3 is a schematic diagram of a protocol format for downlink frame communications;

DETAILED DESCRIPTION OF THE DRAWINGS

Figure 2:
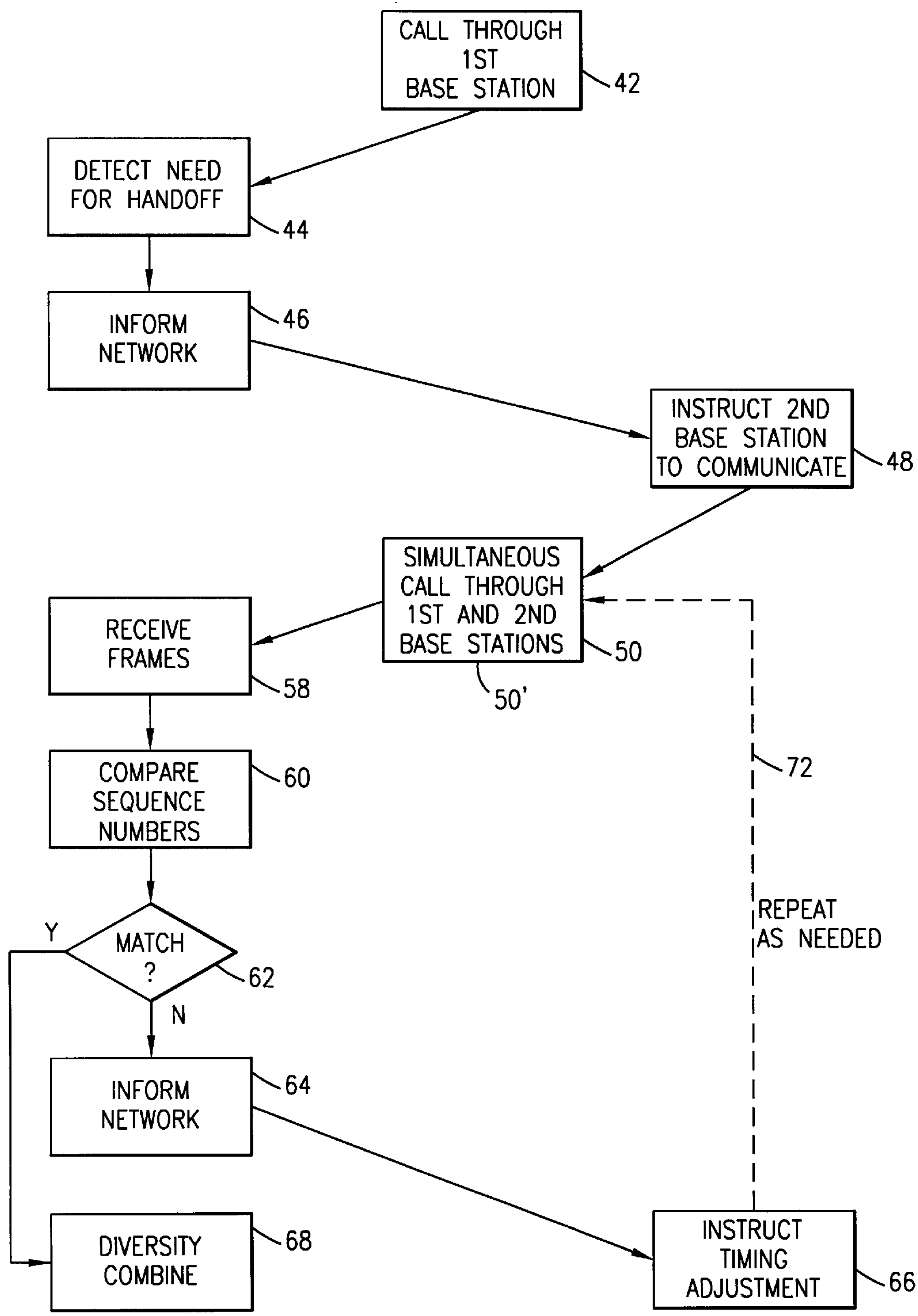
FIG. 2 is a flow diagram relating to downlink communications illustrating operation of a CDMA cellular communications system in effectuating a soft handoff in accordance with the present invention.

Continued reference is now made to FIG. 1B, with further reference made to FIG. 2 wherein there is shown a flow diagram illustrating for downlink communications the operation of a CDMA cellular communications system in effectuating a soft handoff in accordance with the present invention. In FIG. 2, the blocks illustrated on the left hand side of the drawing relate to the actions taken by the mobile station 18, the blocks illustrated on the right hand side of the drawing relate to the actions taken by the telecommunications network components (including the mobile switching center 24 and base stations 16), and the blocks illustrated in the center of the drawing relate to actions taken by both the mobile station and the telecommunications network components.

At the time the illustrated soft handoff process is about to begin, the mobile station 18 is engaged (block 42) in a call that is being handled through the first base station 14(1) using communications path 22(1). Next, a need is detected (block 44) to perform a handoff with respect to the call to provide future handling through the second base station 14(2) using communications path 22(2). The detection process of block 44 likely, but not necessarily, occurs as a result of mobile station made signal strength measurements and/or signal to interference (S/I) ratio. These measurements are typically made on the pilot and/or traffic channel for the first base station 14(1) and/or the pilot channel for the second base station 14(2). The mobile station then informs (block 46) the network of the need for a handoff by sending a message to the mobile switching center through the first base station 14(1). Responsive thereto, the mobile switching center instructs (block 48) the second base station 14(2) to establish communication with the mobile station. At that point, the call that the mobile station 18 was engaged in (see, block 42) is now being handled (block 50) with duplicate communications in a simultaneous manner through both the first base station 14(1) (using communications path 22(1)) and the second base station 14(2) (using communications path 22(2)). This requires for downlink communications that the mobile switching center duplicate the communications and route them through both the first and second base stations for delivery to the mobile station.

Reference is now made to FIG. 3. These communications comprise a plurality of frames formatted in accordance with a protocol 52 including a plurality of information fields 54. One included field 54 comprises a sequence number field 54(1) containing a sequence number assigned to the associated frame 56 within the sequence of frames for the communication transmitted over the downlink. These sequence numbers may be derived in any one of a number of known ways (including incrementing from a zero reference or determined in accordance with a time reference). The protocol 52 further includes a data field 54(2) containing the voice and/or signaling data being transmitted with respect to the call (in this case, the downlink call communications from the mobile switching center to the mobile station). Accordingly, in the context of FIG. 2, in duplicating the downlink communications for delivery to the mobile station via both the first and second base stations, the corresponding individual frames 56 of the duplicate communications include identical sequence numbers in the sequence number field 54(1) as well as identical voice and/or signaling data in the data field 54(2).

Referring now again to FIG. 2, the duplicate downlink communications travel through the respective first and second base stations (block 50) to the mobile station. At the mobile station, a frame of the communication transmitted from the first base station as well as a frame of the communication transmitted from the second base station are substantially simultaneously received (block 58). For the reasons identified previously in connection with FIG. 1B, it is possible that the frame received from the first base station transmission and the frame received from the second base station transmission may not be the respective duplicates of each other (i.e., synchronous reception of the duplicated frames may not occur). To make this determination, the mobile station compares the included frame sequence numbers (block 60) of the received frames. If the frame sequence numbers for the substantially simultaneously received frames do not match (block 62), the mobile station informs (block 64) the network of the need for an adjustment in time for the duplicated downlink communications in order to provide for synchronous frame reception. In informing the network, the mobile station further identifies which of the duplicated downlink communications was received first, and thus needs to be respectively delayed in the future. Responsive thereto, the mobile switching center instructs (block 66) the first and/or second base stations to adjust their respective transmit times for the duplicated downlink communications. The processes of blocks 58, 60, 62, 64 and 66 may have to be repeatedly performed (see, dotted line path 72) over an iterative period in order to move the duplicate communications into substantially synchronous frame alignment when received by the mobile station. At this point, the call that the mobile station 18 was engaged in (see, block 42) is now being handled (block 50') with duplicate communications in a simultaneous but now respectively time offset manner through both the first base station 14(1) (using communications path 22(1)) and the second base station 14(2) (using communications path 22(2)). Responsive to the substantially simultaneous receipt of frames transmitted from the first base station and the second base station having identical sequence numbers (block 62), this being indicative of substantially synchronous reception, the mobile station performs diversity combining (block 68) of the received duplicate communication in a manner well known to those skilled in the art.

Figure 4:
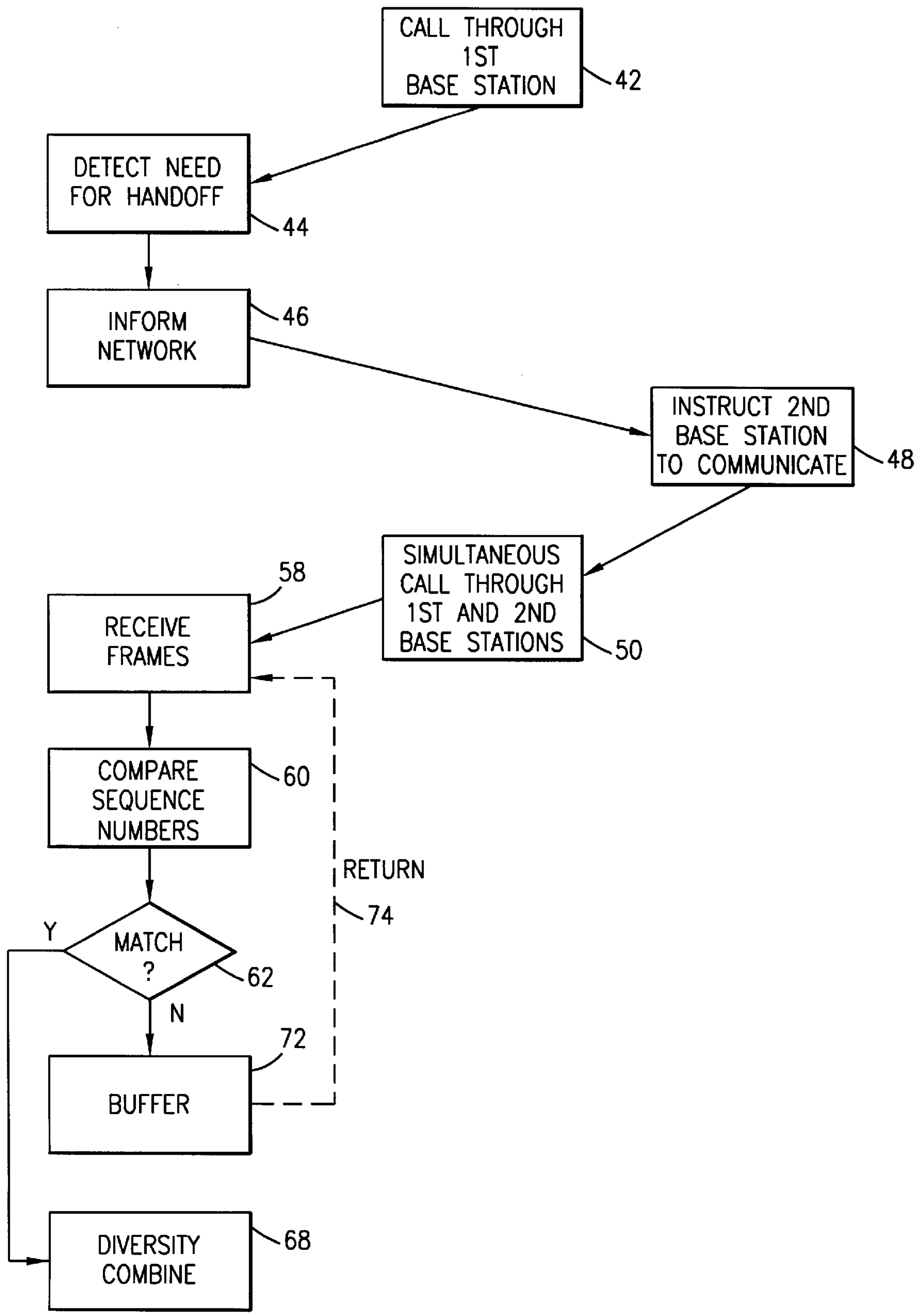
FIG. 4 is a flow diagram relating to downlink communications illustrating operation of a CDMA cellular communications system in effectuating a soft handoff in accordance with an alternative embodiment of the present invention.

Further reference is now made to FIG. 4 wherein there is shown a flow diagram illustrating for downlink communications the operation of a CDMA cellular communications system in effectuating a soft handoff in accordance with an alternative embodiment of the present invention. In FIG. 4, the blocks illustrated on the left hand side of the drawing relate to the actions taken by the mobile station 18, the blocks illustrated on the right hand side of the drawing relate to the actions taken by the telecommunications network components (including the mobile switching center 24 and base stations 16), and the blocks illustrated in the center of the drawing relate to actions taken by both the mobile station and the telecommunications network components.

At the time the illustrated soft handoff process is about to begin, the mobile station 18 is engaged (block 42) in a call that is being handled through the first base station 14(1) using communications path 22(1). Next, a need is detected (block 44) to perform a handoff with respect to the call to provide future handling through the second base station 14(2) using communications path 22(2). The detection process of block 44 likely, but not necessarily, occurs as a result of mobile station made signal strength measurements. These measurements are typically made on the pilot and/or traffic channel for the first base station 14(1) and/or the pilot channel for the second base station 14(2). The mobile station then informs (block 46) the network of the need for a handoff by sending a message to the mobile switching center through the first base station 14(1). Responsive thereto, the mobile switching center instructs (block 48) the second base station 14(2) to establish communication with the mobile station. At that point, the call that the mobile station 18 was engaged in (see, block 42) is now being handled (block 50) with duplicate communications in a simultaneous manner through both the first base station 14(1) (using communications path 22(1)) and the second base station 14(2) (using communications path 22(2)). This requires for downlink communications that the mobile switching center duplicate the communications and route them through both the first and second base stations for delivery to the mobile station. In duplicating the downlink communications for delivery to the mobile station via both the first and second base stations, the corresponding individual frames 56 of the duplicate communications include identical sequence numbers in the sequence number field 54(1) as well as identical voice and/or signaling data in the data field 54(2). The duplicate downlink communications travel through the respective first and second base stations (block 50) to the mobile station. At the mobile station, a frame of the communication transmitted from the first base station as well as a frame of the communication transmitted from the second base station are substantially simultaneously received (block 58). For the reasons identified previously in connection with FIG. 1B, it is possible that the frame received from the first base station transmission and the frame received from the second base station transmission may not be the duplicates of each other (i.e., synchronous reception of the duplicated frames may not occur). To make this determination, the mobile station compares the included frame sequence numbers (block 60) of the received frames. If the frame sequence numbers for the substantially simultaneously received frames do not match (block 62), the mobile station delays (block 72) the earlier arriving one of the frames (i.e., the frame having a higher frame sequence number) through the use of known data buffering techniques and returns (see, dotted line path 74) to receive a next set of frames. When the frame of the other duplicate communication having the identical frame sequence number and matching the buffered frame is thereafter received (block 58), the mobile station performs diversity combining (block 68) of the received duplicate communication in a manner well known to those skilled in the art. Depending on the length of the time offset, the processes of blocks 58, 60, 62 and 72, as well as the return path 74, may have to occur several times before the proper frame in the other duplicate communication arrives.

Figure 5:
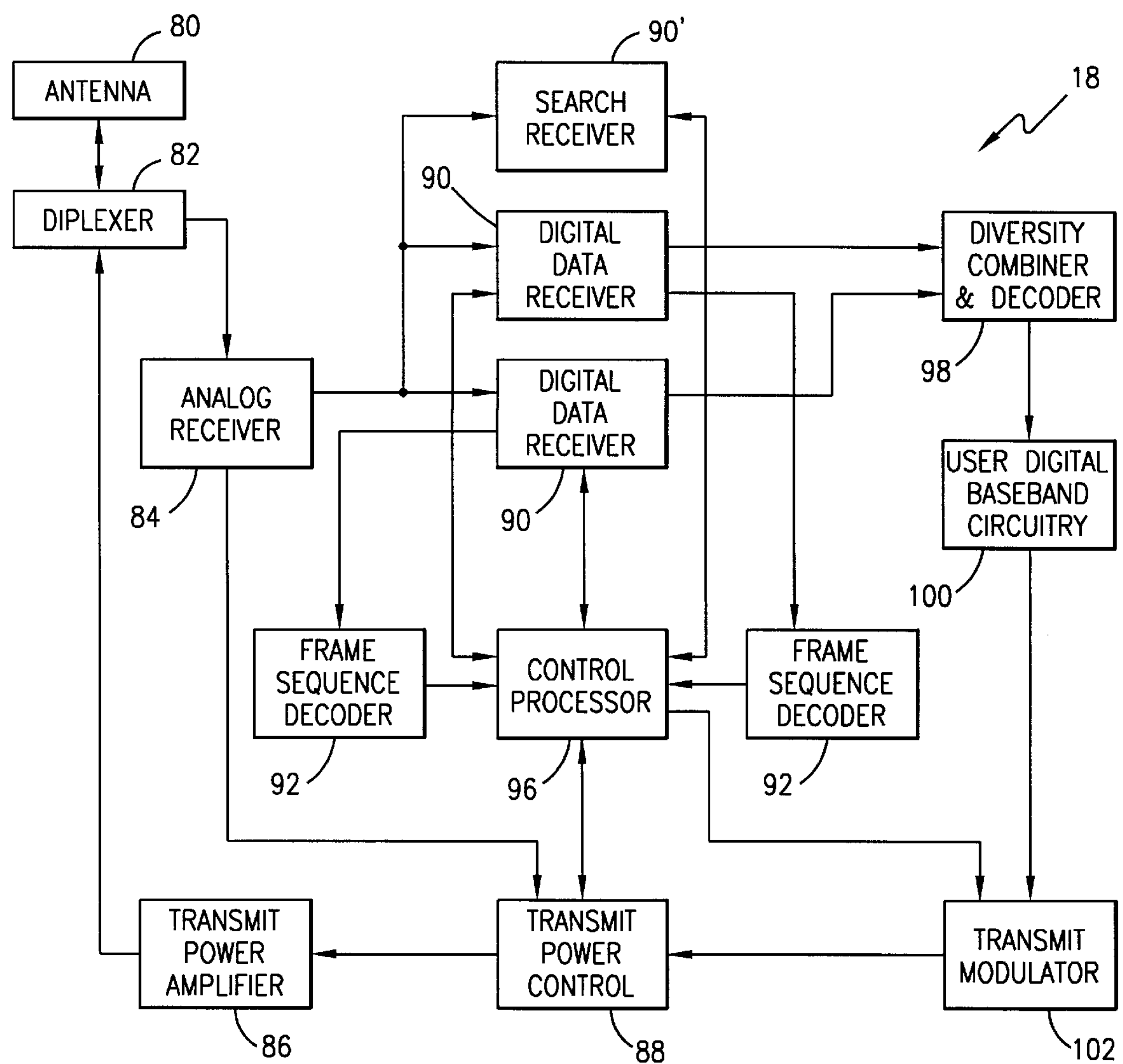
FIG. 5 is a block diagram of a mobile station in accordance with the present invention.

Reference is now made to FIG. 5 wherein there is shown a block diagram of a mobile station 18 in accordance with the present invention. The mobile station 18 includes an antenna 80 which is coupled through diplexer 82 to analog receiver 84 and transmit power amplifier 86. Antenna 80 and diplexer 82 are of standard design and permit simultaneous transmission and reception through a single antenna. Antenna 80 collects transmitted signals and provides them through diplexer 82 to analog receiver 84. Receiver 84 receives the RF frequency signals from diplexer 82 for amplification and frequency down conversion to an intermediate frequency. The generated intermediate frequency signal is then passed through a bandpass filter of receiver 84 whose characteristics are selected to match the waveform of the CDMA signal output by the base station. Receiver 84 further performs an analog-to-digital conversion of the intermediate frequency signal to a digital signal. Receiver 84 processing of the received signal also influences transmit power control 88 which is connected to the transmit power amplifier 86.

The output digital signal from receiver 84 is provided to each of two or more data receivers 90 as well as to a search receiver 90'. Multiple data receivers 90 allow for the implementation of diversity reception processing of the CDMA signals as is known to those skilled in the art. In this connection, processor 96 provides signals to data receivers 90 for each to process a different CDMA signal. Data receivers 90 may then process a multipath signal received from a single base station or different signals output from different base stations. The function of the data receivers 90 is to correlate the received intermediate frequency signals to the spread spectrum coding sequence(s) used to encode the base station transmitted CDMA signals. Processor 96 further controls the operation of the search receiver 90' to scan the time domain for multipath pilot signals received from a single base station or for pilot signals output from multiple base stations. The function of the search receiver 90' is to detect and measure the signal strength of the pilot channels for output to the processor 96. The outputs of the data receivers 90 are provided to a diversity combiner and decoder circuit 98 which functions to adjust the timing of the two signals (into frame alignment) and add the aligned frames together. The resulting combined signal is then decoded by the circuit 98 and output to user digital baseband circuitry 100 comprising, perhaps, a vocoder and other user interface circuits.

In accordance with the present invention, the diversity combiner and decoder circuit 98 adjusts the timing of, and adds together, the receiver 90 output signals only if the frame sequence numbers for each of the aligned frames therein match (i.e., only if the frames are received substantially synchronously). To make this determination, the mobile station 18 further includes a frame sequence decoder 92 associated with each of the data receivers 90. The decoders 92 extract the frame sequence number from each substantially simultaneously received frame of the receiver 90 output signals. The extracted frame sequence numbers are then provided to the processor 96 where they are compared and used to control with a signal the operation of the diversity combiner and decoder circuit 98 such that the aligned frames are added together only if their corresponding frame sequence numbers match. Otherwise, when frame synchronization between signals from base stations 16(l) and 16(2) cannot be confirmed, diversity combining and decoding are performed over either of the received signals.

With respect to the embodiment of the present invention illustrated in FIG. 3, if the frame sequence numbers for substantially simultaneously received frames of the signals do not match, the processor 96 generates a signal indicative thereof, with the generated signal causing transmission of a timing adjustment message back as an uplink communication to the originating base station(s) using the functionality provided by antenna 80, diplexer 82, transmit power amplifier 86, transmit power control 88, and transmit modulator 102. Responsive thereto, as discussed above, the network adjusts the timing of the signals output from the plural base stations (by delaying transmission of the earlier arriving of the duplicate signal communications, or decreasing transmission delay of the later arriving of the duplicate signal communications) for substantially synchronous frame reception at the mobile station 18. An iterative process may need to be performed with respect to the delay instruction in order to move the duplicate communications into substantially synchronous frame alignment when received by the mobile station. The frames of the synchronously received signals, now having matching frame sequence numbers, are then output from the data receivers 90 for processing by the diversity combiner and decoder circuit 98. The substantially simultaneously received signals with frames having matching frame sequence numbers are then frame aligned, added together and decoded.

With respect to the embodiment of the present invention illustrated in FIG. 4, on the other hand, the processor 96 instructs the data receiver 90 receiving the earlier of the two signals (i.e., the one with frames having a higher relative frame sequence number) to buffer the signal until such time as the decoder 92 associated with the other data receiver 90 subsequently detects reception of the frame of the redundantly transmitted signal having a matching frame sequence number. At this point in time, the frames of the signals are output from the data receivers 90 for processing by the diversity combiner and decoder circuit 98. The received signals buffered as needed with frames having matching frame sequence numbers are then frame aligned, added together and decoded.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for mobile station processing of transmitted duplicate base station communications, each communication including a plurality of frames identified by frame sequence numbers, comprising the steps of:

receiving the duplicate base station communications;

comparing frame sequence numbers for substantially simultaneously received frames within the received duplicate base station communications;

processing the substantially simultaneously received frames if the frame sequence numbers match; and generating a signal for transmission from the mobile station to an origination source of the duplicate base station communications if the frame sequence numbers do not match, the signal identifying non-synchronous reception of the frames within the duplicate base station communications and requesting a timing adjustment be made to the duplicate base station communication transmissions to provide for substantially synchronous reception of frame sequence number matching frames within the received duplicate base station communications at the mobile station.

2. The method as in claim 1 wherein the duplicate base station communications comprise downlink soft handoff communications transmitted from the base stations to the mobile station in a cellular communications system.

3. The method as in claim 1 wherein the step of processing comprises the step of aligning the substantially simultaneously received frames within the duplicate communications.

4. The method as in claim 3 wherein the step of processing further comprises the step of adding together user data of the substantially simultaneously received frames within the duplicate communications.

5. The method as in claim 1 wherein the step of processing comprises the step of diversity combining the substantially simultaneously received frames within the duplicate communications.

6. A method for mobile station processing of transmitted duplicate base station communications, each communication including a plurality of frames identified by frame sequence numbers, comprising the steps of:

receiving the duplicate base station communications;

comparing frame sequence numbers for substantially simultaneously received frames within the received duplicate base station communications;

buffering frames of an earlier arriving one of the duplicate base station communications if the frame sequence numbers do not match; and processing the substantially simultaneously received frames if the frame sequence numbers match, or processing the buffered frames of the earlier arriving one of the duplicate base station communication with the frame sequence number matching frames of a later arriving one of the duplicate base station communications if the frame sequence numbers did not match.

7. The method as in claim 6 wherein the duplicate base station communications comprise downlink soft handoff communications transmitted to the mobile station in a cellular communications system.

8. The method as in claim 6 wherein the steps of processing comprise the step of aligning the received frames within the duplicate communications having matching frame sequence numbers.

9. The method as in claim 8 wherein the steps of processing further comprise the step of adding together user data of the received frames within the duplicate communications having matching frame sequence numbers.

10. The method as in claim 6 wherein the steps of processing comprise the step of diversity combining the received frames within the duplicate base station communications having matching frame sequence numbers.

11. A method for performing soft handoff within a communications system, comprising the steps of:

engaging in a base station communication with a mobile station via first communications path associated with a first cell;

detecting a need for a handoff of the communication from the first cell to a second cell;

engaging in a duplicate base station communication with the mobile station via the first communications path and also via a second communications path associated with the second cell;

receiving a message from the mobile station indicative of non substantially synchronous reception of individual frames within the duplicate base station communication whose frame sequence numbers match; and adjusting the timing of base station communications over the first and second communications paths to provide for substantially synchronous matching frame reception by the mobile station of the duplicate base station communication.

12. The method of claim 11 wherein the step of detecting comprises the step of processing signal strength measurements made with respect to the communication with the mobile station over the first communications path.

13. The method of claim 11 wherein the step of detecting comprises the step of processing signal strength measurements made by the mobile station with respect to the second cell.

14. The method of claim 11 wherein the step of adjusting comprises the step of delaying communications transmission of one of the duplicate communications via either the first or second communications path.

15. The method of claim 11 further including the steps of:

receiving the duplicate communications;

comparing frame sequence numbers for substantially simultaneously received frames within the received duplicate base station communications;

processing the substantially simultaneously received frames if the frame sequence numbers match; and generating the message for transmission from the mobile station to an origination source of the duplicate communications if the frame sequence numbers do not match requesting that a timing adjustment be made to the duplicate base station communication transmissions over the first and second communications paths to provide for substantially synchronous reception at the mobile station of frame sequence number matching frames within the received duplicate base station communications.

16. A mobile communications device, comprising:

a first receiver for receiving a first communication transmitted from a first base station over a first communications path;

a second receiver for receiving a second communication transmitted from a second base station over a second communications path, wherein the first and second communications comprise duplicate communications;

a first decoder connected to the first receiver for extracting a frame sequence number from each frame within the first communication;

a second decoder connected to the second receiver for extracting a frame sequence number from each frame within the second communication;

a processor connected to the first and second decoders for comparing the extracted frame sequence numbers for substantially simultaneously received frames of the received duplicate communications, the processor generating a first signal if the frame sequence numbers match and a second signal if the frame sequence numbers do not match;

means for combining and decoding the substantially simultaneously received frames in response to the first signal; and means for transmitting from the mobile station to an origination source of the duplicate communications in response to the second signal a request that a timing adjustment be made to the first and second base station duplicate communication transmissions over the first and second communications paths to provide for substantially synchronous reception by the mobile station first and second receivers of frame sequence number matching frames.

17. The communications device of claim 16 wherein the means for combining and decoding comprises a diversity combiner and decoder.

18. The communications device of claim 16 wherein the mobile station operates in a cellular communications system.

19. The communications device of claim 18 wherein the duplicate communications comprise communications for a soft handoff of the mobile station from a first cell associated with the first communications path to a second cell associated with the second communications path.

20. The communications device of claim 18 wherein the cellular communications system comprises a code division multiple access (CDMA) communications system.

21. A mobile communications device, comprising:

a first receiver for receiving a first communication transmitted from a first base station over a first communications path;

a second receiver for receiving a second communication transmitted from a second base station over a second communications path, wherein the first and second communications comprise duplicate communications;

a first decoder connected to the first receiver for extracting a frame sequence number from each frame within the first communication;

a second decoder connected to the second receiver for extracting a frame sequence number from each frame within the second communication;

a processor connected to the first and second decoders for comparing the extracted frame sequence numbers for substantially simultaneously received frames of the received duplicate communications, the processor generating a first signal if the frame sequence numbers match and a second signal if the frame sequence numbers do not match;

means for buffering frames of an earlier arriving one of the duplicate communications in response to the second signal;

means for combining and decoding the substantially simultaneously received frames in response to the first signal; and means for combining and decoding the buffered frames with the frame sequence number matching frames of a later arriving one of the duplicate communications in response to the second signal.

22. The communications device of claim 21 wherein the means for combining and decoding comprises a diversity combiner and decoder.

23. The communications device of claim 21 wherein the mobile station operates in a cellular communications system.

24. The communications device of claim 23 wherein the duplicate communications comprise communications for a soft handoff of the mobile station from a first cell associated with the first communications path to a second cell associated with the second communications path.

25. The communications device of claim 23 wherein the cellular communications system comprises a code division multiple access (CDMA) communications system.

* * * * *